US011915562B2

(12) United States Patent
Li et al.

(10) Patent No.: US 11,915,562 B2
(45) Date of Patent: Feb. 27, 2024

(54) AUTOMATIC VENDING MACHINE, AND ITEM DISPENSING METHOD FOR SAME

(71) Applicants: Weihai New Beiyang Digital Technology Co., Ltd., Shandong (CN); Shandong New Beiyang Information Technology Co., Ltd., Shandong (CN)

(72) Inventors: Deyi Li, Shandong (CN); Jian Li, Shandong (CN); Juntao Liu, Shandong (CN); Hongming Li, Shandong (CN); Tianxin Jiang, Shandong (CN)

(73) Assignees: WEIHAI NEW BEIYANG DIGITAL TECHNOLOGY CO., LTD., Shandong (CN); SHANDONG NEW BEIYANG INFORMATION TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 17/782,078

(22) PCT Filed: Sep. 21, 2020

(86) PCT No.: PCT/CN2020/116357
§ 371 (c)(1),
(2) Date: Jun. 2, 2022

(87) PCT Pub. No.: WO2021/114803
PCT Pub. Date: Jun. 17, 2021

(65) Prior Publication Data

US 2023/0005320 A1 Jan. 5, 2023

(30) Foreign Application Priority Data

Dec. 8, 2019 (CN) ......................... 201911257278.6

(51) Int. Cl.
*G07F 11/10* (2006.01)
*G07F 9/00* (2006.01)
*G07F 11/16* (2006.01)

(52) U.S. Cl.
CPC .............. *G07F 9/006* (2013.01); *G07F 11/10* (2013.01); *G07F 11/16* (2013.01)

(58) Field of Classification Search
CPC ....................................................... G07F 9/006
See application file for complete search history.

(56) References Cited

U.S. PATENT DOCUMENTS 5,788,115 A * 8/1998 Halliburton ............... G07F 9/02
312/45
2017/0036798 A1 2/2017 Prahlad et al.
(Continued)

FOREIGN PATENT DOCUMENTS

CN 206179091 U 5/2017
CN 108492454 A 9/2018
(Continued)

OTHER PUBLICATIONS

International Search Report dated Dec. 10, 2020 in related application Serial No. PCT/CN2020/116357.
(Continued)

*Primary Examiner* — Gene O Crawford
*Assistant Examiner* — Ayodeji T Ojofeitimi
(74) *Attorney, Agent, or Firm* — Mark H. Whittenberger; Holland & Knight LLP

(57) ABSTRACT

An automatic vending machine includes a cabinet, a plurality of item columns, a pickup port and a delivery apparatus, and the delivery apparatus includes a hopper and a hopper drive mechanism. An item dispensing method of the automatic vending machine includes: determining, according to items to be purchased, all of item combination manners having a lowest number of item dispensing operations as candidate item combination manners; determining all of pickup manners for picking up items in each of the candidate item combination manners; determining all of item dispensing paths in one-to-one correspondence to all of pickup manners of all of the candidate item combination manners; and selecting, from all of the item dispensing paths, an item dispensing path having a highest efficiency as a target item dispensing path, and controlling, based on the target item dispensing path, the hopper to dispense items.

12 Claims, 6 Drawing Sheets

(56) References Cited

U.S. PATENT DOCUMENTS

| | | | | |
|---|---|---|---|---|
| 2020/0323737 | A1* | 10/2020 | Einav | B65B 5/103 |
| 2021/0374815 | A1* | 12/2021 | Smith | G07F 11/1657 |

FOREIGN PATENT DOCUMENTS

| | | | |
|---|---|---|---|
| CN | 109147180 | A | 1/2019 |
| CN | 109461255 | A | 3/2019 |
| CN | 109712318 | A | 5/2019 |
| CN | 209015289 | A | 6/2019 |
| CN | 109993908 | A | 7/2019 |
| CN | 110335414 | A | 10/2019 |
| JP | 2019075016 | A | 5/2019 |
| WO | 00/30961 | A1 | 6/2000 |

OTHER PUBLICATIONS

First Office Action issued in Chinese Patent Application No. 201911257278.6 dated Aug. 3, 2022.

European Search Report issued in the Application Serial No. 20900195.7 dated Nov. 2, 2023.

* cited by examiner

AUTOMATIC VENDING MACHINE, AND ITEM DISPENSING METHOD FOR SAME

RELATED APPLICATIONS

The subject application is a U.S. National Stage application of International Application No. PCT/CN2020/116357, filed on 21 Sep. 2020, which claims the priority of Chinese Patent Application No. 201911257278.6, filed on 8 Dec. 2019, the contents of which are herein incorporated by reference in their entirety.

This application claims priority to Chinese Patent Application No. 201911257278.6 filed with the CNIPA on Dec. 8, 2019, the disclosure of which is incorporated herein by reference in its entirety.

TECHNICAL FIELD

The present application relates to the field of automatic vending technologies and for example, to an automatic vending machine and an item dispensing method for same.

BACKGROUND

An automatic vending machine is a commercial automation device used for automatically selling items. Due to not restricted by time and place, saving labor and facilitating transactions, the automatic vending machine is more and more widely used.

With the development of automatic vending machine technology, more and more automatic vending machines support purchasing multiple items at one time. An item dispensing method of an automatic vending machine is provided in the related art, and the automatic vending machine includes an item conveying apparatus for transporting items. In a case where a customer purchases multiple items at one time, the item conveying apparatus conveys the items to be dispensed several times, and one item is conveyed each time. When the number of items purchased by the customer is larger, it takes more time for the item conveying apparatus to convey all the items purchased by the customer to a pickup port, and the item dispensing time is long and the user experience is poor. Therefore, the item dispensing method of the automatic vending machine provided in the related art has the problem of low item dispensing efficiency.

SUMMARY

The present application provides an automatic vending machine and an item dispensing method of an automatic vending machine which have high item dispensing efficiency.

An item dispensing method of an automatic vending machine is provided in an embodiment. The automatic vending machine includes a cabinet, a plurality of item columns disposed within the cabinet, a pickup port disposed on a surface of the cabinet and a delivery apparatus disposed between the plurality of item columns and the pickup port, and the delivery apparatus includes a hopper and a hopper drive mechanism configured to drive the hopper to move between the plurality of item columns and the pickup port. The item dispensing method of the automatic vending machine includes steps described below.

According to items to be purchased, all of item combination manners having a lowest number of item dispensing operations are determined as candidate item combination manners.

All of pickup manners for picking up items in each of the candidate item combination manners are determined.

All of item dispensing paths in one-to-one correspondence to all of pickup manners of all of the candidate item combination manners are determined.

An item dispensing path having a highest efficiency is selected from all of the item dispensing paths as a target item dispensing path, and based on the target item dispensing path, the hopper is controlled to dispense items.

An automatic vending machine is provided in an embodiment and includes a control apparatus, a cabinet, a plurality of item columns disposed within the cabinet, a pickup port disposed on a surface of the cabinet and a delivery apparatus disposed between the plurality of item columns and the pickup port. The delivery apparatus includes a hopper and a hopper drive mechanism configured to drive the hopper to move between the plurality of item columns and the pickup port, the hopper drive mechanism is electrically connected to the control apparatus, and the control apparatus is configured to:

determine, according to items to be purchased, all of item combination manners having a lowest number of item dispensing operations as candidate item combination manners;

determine all of pickup manners for picking up items in each of the candidate item dispensing manners;

determine all of item dispensing paths in one-to-one correspondence to all of pickup manners of all of the candidate item combination manners; and select, from all of the item dispensing paths, an item dispensing path having a highest efficiency as a target item dispensing path, and control, based on the target item dispensing path, the hopper to dispense items.

REFERENCE LIST

Figure 1:
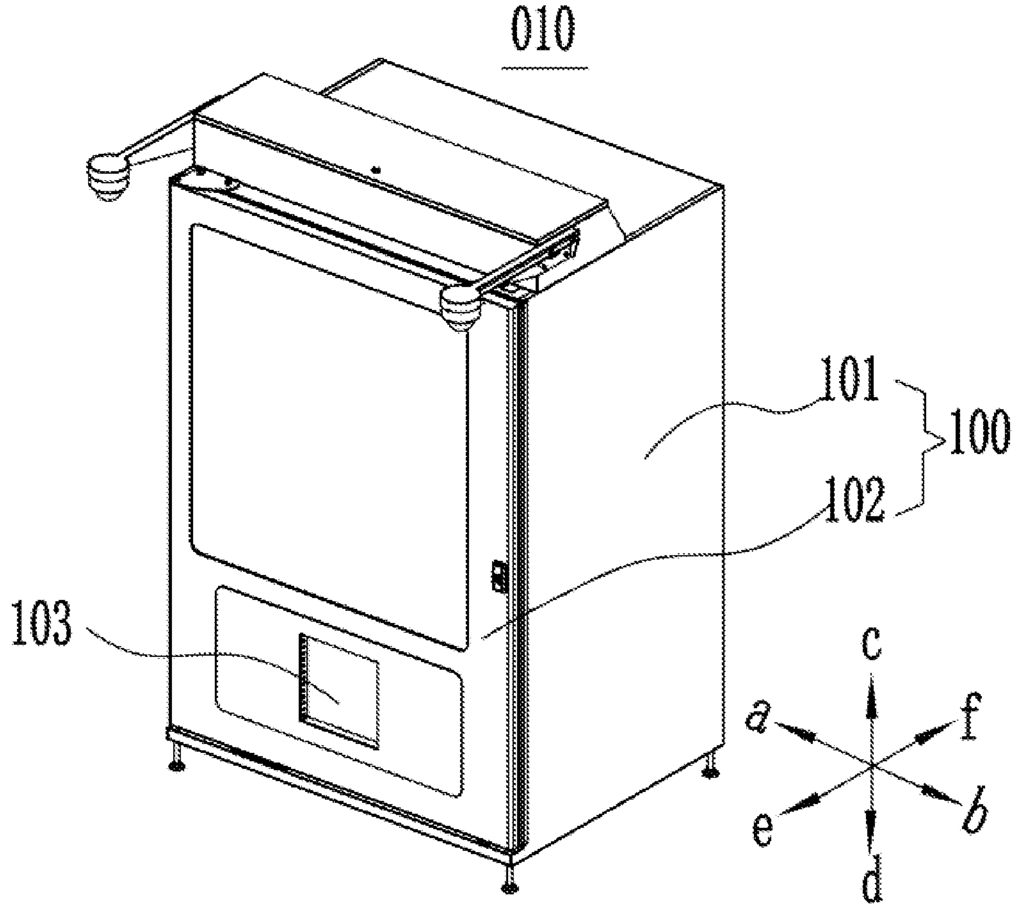
FIG. 1 is a schematic view of an external structure of an automatic vending machine according to an embodiment of the present application.

010 automatic vending machine
100 cabinet
101 cabinet body
102 cabinet door
103 pickup port
200 stowage apparatus
210 item column
211 conveying mechanism
211*a* push plate

211*b* push plate drive component
300 delivery apparatus
310 hopper
320 hopper drive mechanism
321 horizontal drive mechanism
322 vertical drive mechanism
400 storage apparatus
500 control apparatus

DETAILED DESCRIPTION

It is to be noted that similar reference numerals and letters indicate similar items in the subsequent drawings, and therefore, once a particular item is defined in one drawing, the item needs no more definition and explanation in subsequent drawings.

In the description of the present disclosure, it is to be noted that the orientational or positional relationships indicated by terms "above", "below", "inside", "outside" and the like are based on the orientational or positional relationships illustrated in the drawings or the orientational or positional relationship that products are usually used in, which are for the mere purpose of facilitating and simplifying the description of the present application and do not indicate or imply that the apparatus or element referred to has a specific orientation and is constructed and operated in a specific orientation, and thus it is not to be construed as limiting the present application.

Moreover, terms "first" and "second" are merely for distinguishing the description and are not to be construed as indicating or implying relative importance.

It is to be noted that if not in collision, features therein in the embodiments of the present application may be combined with each other.

Figure 2:
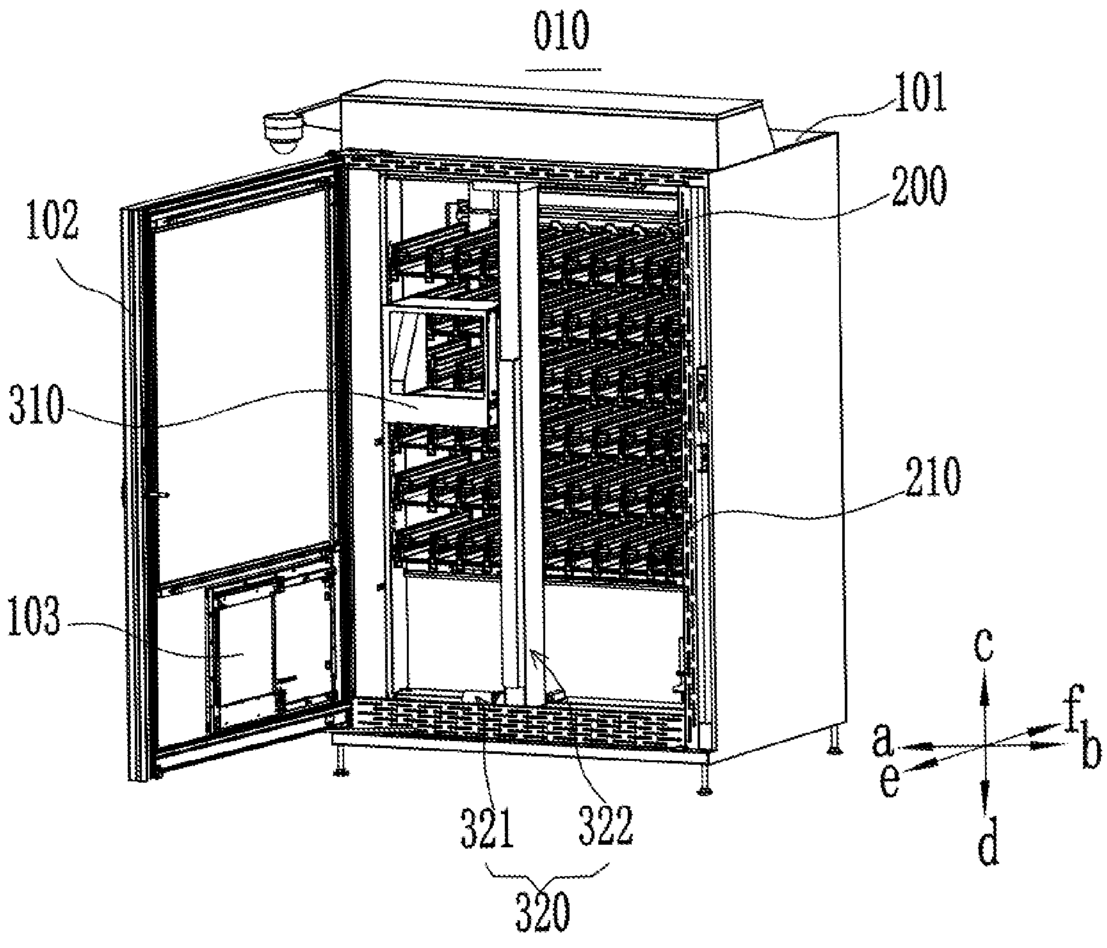
FIG. 2 is a schematic view of the internal structure of an automatic vending machine according to an embodiment of the present application.
Figure 3:
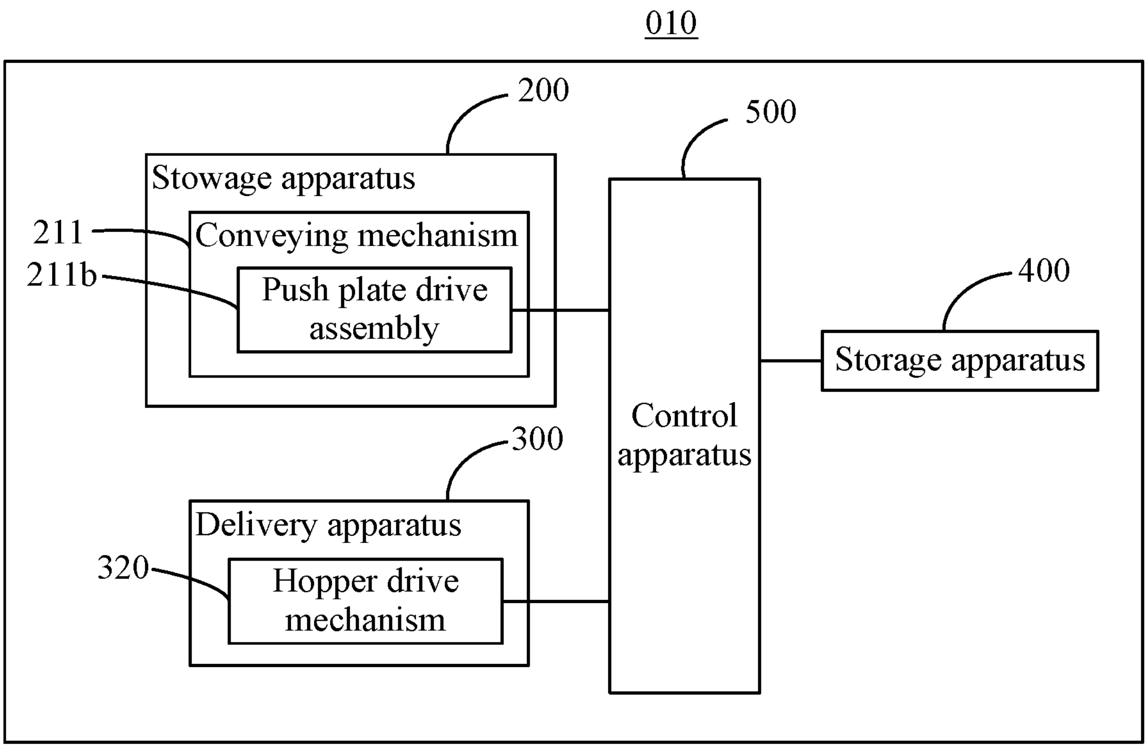
FIG. 3 is a block diagram illustrating the composition of an automatic vending machine according to an embodiment of the present application.
Figure 4:
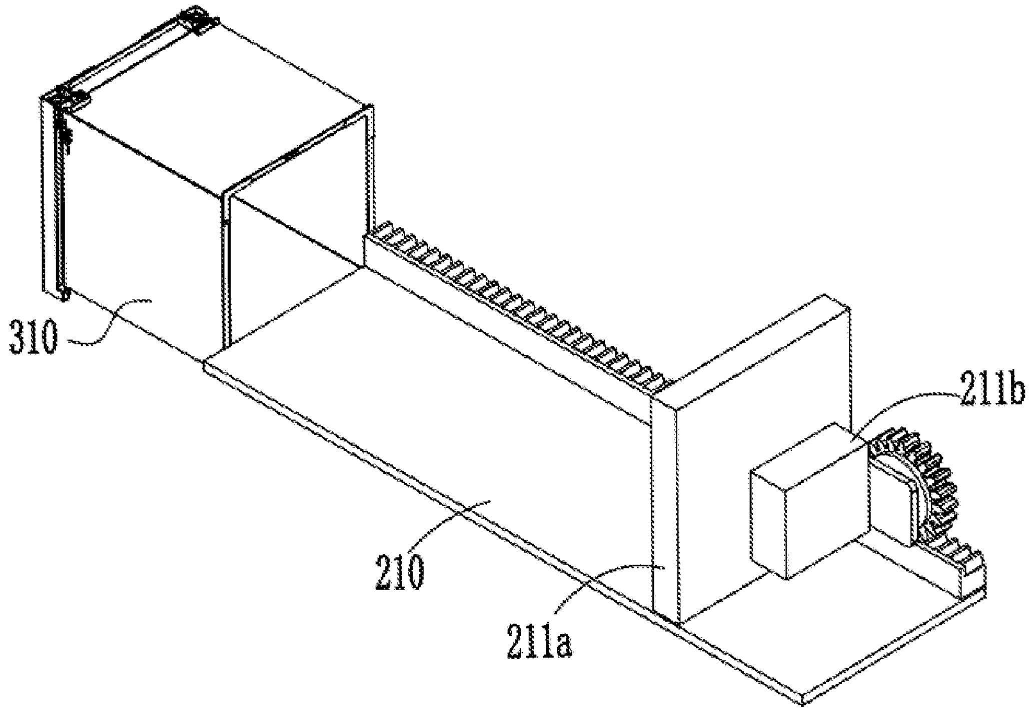
FIG. 4 is a schematic view of a local structure of an automatic vending machine according to an embodiment of the present application.

FIG. 1 is a schematic view of an external structure of an automatic vending machine according to an embodiment of the present application. FIG. 2 is a schematic view of the internal structure of an automatic vending machine according to an embodiment of the present application. FIG. 3 is a block diagram illustrating the composition of an automatic vending machine according to an embodiment of the present application. FIG. 4 is a schematic view of a local structure of an automatic vending machine according to an embodiment of the present application. Referring to FIGS. 1 to 4, the automatic vending machine provided in the embodiments of the present application will be described below.

As shown in FIGS. 1 to 4, the automatic vending machine 010 includes a cabinet 100, a stowage apparatus 200, a delivery apparatus 300, a storage apparatus 400, and a control apparatus 500.

As shown in FIG. 1, the cabinet 100 includes a cabinet body 101 and a cabinet door 102. The cabinet door 102 is movably connected to the cabinet body 101. The cabinet body 101 includes an opening (not shown in figure). The cabinet door 102 can move relative to the opening of the cabinet body 101 such that the cabinet body 101 is open or closed. The cabinet door 102 is provided with a pickup port 103 for the user to take out items.

The stowage apparatus 200 is configured to accommodate items for sale. As shown in FIG. 2, the stowage apparatus 200 is disposed inside the cabinet body 101. The stowage apparatus 200 is disposed opposite to the cabinet door 102. The stowage apparatus 200 includes a plurality of item columns 210 for accommodating items. The plurality of item columns 210 are arranged in M layers in an up-and-down direction (that is, the direction shown by the arrow cd) and are arranged in N rows in a left-and-right direction (that is, the direction shown by the arrow ab). The length direction of each item column 210 is configured to be in a front-and-rear direction (that is, the direction shown by the arrow ef). One end of each item column 210 close to the cabinet door 102 is provided with an outlet, and the outlet of each item column 210 directly faces the cabinet door 102.

Each item column 210 is provided with a conveying mechanism 211, and the conveying mechanism 211 is configured to drive the items in the item column 210 move toward the outlet of the item column 210 so that the items are conveyed out from the outlet of the item column 210. FIG. 4 is a schematic view of a local structure of an automatic vending machine according to an embodiment of the present application. As shown in FIGS. 3 and 4, in this embodiment, the conveying mechanism 211 includes a push plate 211*a* and a push plate drive component 211*b*, where the push plate drive component 211*b* is electrically connected to the control apparatus 500 and is in drivingly connected to the push plate 211*a*. Under the control of the control apparatus 500, the push plate drive component 211*b* can drive the push plate 211*a* to move along the length direction of the item column 210, thereby pushing the items in the item column 210 to move toward the outlet of the item column 210.

The delivery apparatus 300 is configured to transport items between the stowage apparatus 200 and the pickup port 103. The delivery apparatus 300 is located between the cabinet door 102 and the stowage apparatus 200. The delivery apparatus 300 includes a hopper 210 and a hopper drive mechanism 320. One end of the hopper 310 close to each item column 210 is provided with an inlet, and one end of the hopper 310 close to the cabinet door 102 is provided with an outlet. The hopper drive mechanism 320 includes a horizontal drive mechanism 321 and a vertical drive mechanism 322. The horizontal drive mechanism 321 and the vertical drive mechanism 322 are electrically connected to the control apparatus 500. Under the control of the control apparatus 500, the horizontal drive mechanism 321 is configured to drive the hopper 310 to move in the left-and-right direction, and the vertical drive mechanism 322 is configured to drive the hopper 310 to move in the up-and-down direction so that the hopper 310 can be moved in either of the up-and-down direction and the left-and-right direction, or the hopper 310 can be moved in both the up-and-down direction and the left-and-right direction at the same time, thereby the inlet of the hopper 310 is made to be opposite to the outlet of any item column 210, or the outlet of the hopper 310 is made to be opposite to the pickup port 103. In the case where the inlet of the hopper 310 is opposite to the outlet of any item column 210, the items in this item column 210 are sent into the hopper 310 after being conveyed out from the outlet of this item column 210. In the case where the outlet of the hopper 310 is opposite to the pickup port 103, the user can take the items in the hopper 310 away through the pickup port 103.

The storage apparatus 400 is configured to store a program of the automatic vending machine 010 and data and variables required during the running of the program. For example, the storage apparatus 400 is configured to store a correspondence of each type of items to the item column 210 accommodating the each type of items, and the storage apparatus 400 is further configured to store first space geometrical information of the hopper 310 and second space geometrical information of each type of items. The first space geometrical information includes volume information, shape and dimension information, area information of a support surface, shape and dimension information of the support surface, and maximum load-bearing information of the hopper 310, and the second space geometrical information includes volume information, shape and dimension information, area information of a bottom surface, shape and dimension information of the bottom surface, and weight information of each type of items.

The control apparatus 500 is electrically connected to the hopper drive mechanism 320 and the storage apparatus 400, and is configured to control the above modules to perform work and perform data calculation and data processing. For example, the control apparatus 500 is configured to determine, according to items to be purchased, all of item combination manners having a lowest number of item dispensing operations as candidate item combination manners; determine all of pickup manners for picking up items in each of the candidate item combination manners; determine all of item dispensing paths in one-to-one correspondence to all of pickup manners of all of the candidate item combination manners; and select, from all of the item dispensing paths, an item dispensing path having a highest efficiency as a target item dispensing path, and control, based on the target item dispensing path, the hopper drive mechanism 320 to drive the hopper 310 to dispense items.

The automatic vending machine 010 provided by this embodiment can determine all of the item combination manners having the lowest number of item dispensing operations as the candidate item combination manners, determine all of the pickup manners for picking up items in each of the candidate item combination manners, and thus acquire all of optional item dispensing paths in a case where the number of item dispensing operations is lowest, and then determine an item dispensing path having the highest efficiency as the target item dispensing path and control, based on the target item dispensing path, the hopper 310 to dispense the items. The automatic vending machine 010 provided by this embodiment shortens the item dispensing time, improves the user experience, and improves the problem of low item dispensing efficiency of the automatic vending machine provided in the related art.

Figure 5:
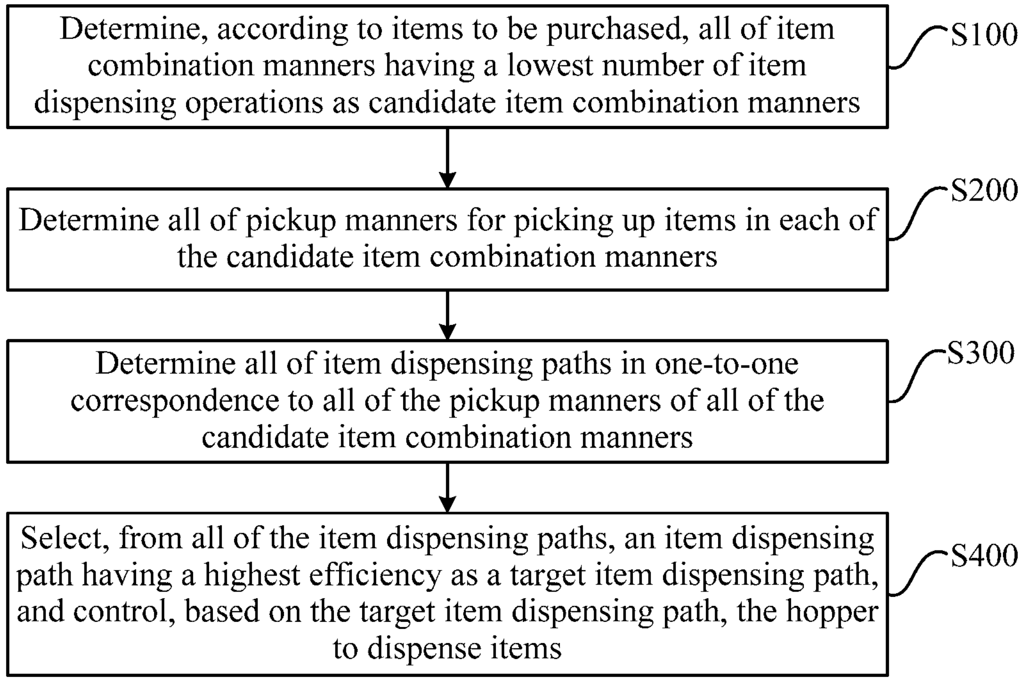
FIG. 5 is a flowchart diagram of an item dispensing method of an automatic vending machine according to an embodiment of the present application.

FIG. 5 is a flowchart diagram of an item dispensing method of an automatic vending machine according to an embodiment of the present application. As shown in FIG. 5, the item dispensing method of the automatic vending machine provided in this embodiment includes described below.

In S100, according to items to be purchased, all of item combination manners having a lowest number of item dispensing operations are determined as candidate item combination manners.

Taking the automatic vending machine 010 provided in the present application as an example, the control apparatus 500 receives a purchase command input by a user, acquires all items to be purchased by the user according to the purchase command, and determines the lowest number of item dispensing operations of the hopper 310 and all of item combination manners corresponding to the lowest number of item dispensing operations according to the first space geometrical information of the hopper 310 and the second space geometrical information of each type of items to be purchased stored in the storage apparatus 400.

In a first embodiment of the present application, S100 is implemented through manners described below.

According to the items to be purchased, it is judged, in a case of N item dispensing operations, whether each group of items in each of the item combination manners is able to be transported by the hopper, sequentially as N ascends, until it is determined that each group of items in at least one item combination manner is able to be transported by the hopper; and all of item combination manners in which each group of items is able to be transported by the hopper are determined, in a case of N item dispensing operations, as the candidate item combination manners; where N is a positive integer.

Taking the automatic vending machine 010 provided by the embodiments of the present application as an example, the control apparatus 500 determines all of items to be purchased according to the purchase command input by the user, in a case where N=1, it is judged whether the hopper 310 can transport all of the items to be purchased to the pickup port 103 at one time, and in a case where it is determined that the hopper 310 can transport all of the items to be purchased to the pickup port 103 at one time, it is determined that the lowest number of item dispensing operations of the hopper 310 is 1, and the item combination manner is such that the hopper 310 transports all of the items to be purchased at one time; in a case where it is determined that the hopper 310 cannot transport all of the items to be purchased to the pickup port 103 at one time, in a case where N=2, it is judged whether the hopper 310 can transport of all the items to be purchased to the pickup port 103 at two times, exemplarily, all of the item combination manners are determined in a case where all of the items to be purchased are transported to the pickup port 103 by the hopper 310 at two times, where in each item combination manner, all of the items to be purchased are divided into two groups, the control apparatus 500 judges whether each group of items in each item combination manner can be accommodated by the hopper 310, if there is at least one item combination manner such that each group of items can be accommodated by the hopper 310, it is determined that the hopper 310 can transport all of the items to be purchased to the pickup port 103 at two times in this item combination manner, at this time, the control apparatus 500 determines that this item combination manner is an item combination manner capable of being performed item dispensing operations, and determines that the lowest number of item dispensing operations is 2, and after the control apparatus 500 judges that whether each group of items in each item combination manner can be accommodated by the hopper 310, the control apparatus 500 determines all of the combination manners in which item dispensing operations can be performed in the case where the lowest number of item dispensing operations is 2 as the candidate item combination manners. In a case where all of item combination manners fail to satisfy the condition that each group of items can be accommodated by the hopper 310, it is determined that the hopper 310 cannot transport all of the items to be purchased to the pickup port 103 at two times. At this time, N is updated to 3, the control apparatus 500 determines whether the hopper 310 can transport all of the items to be purchased to the pickup port 103 at three times, and so on, until the lowest number of item dispensing operations in which the hopper 310 transports all of the items to be purchased to the pickup port 103, and the item combination manner corresponding to the lowest number of item dispensing operations are determined.

For example, in this embodiment, in a case where the control apparatus 500 receives a purchase command to purchase items A, items B and items C input by the user, it is judged whether the hopper 310 can transport all of the items at one time based on the volume of the hopper 310 and the volume of each type of items to be purchased. If it is determined that the hopper 310 cannot transport all of the items at one time, it is judged whether the hopper 310 can transport all of the items at two times. Exemplarily, it is determined that all of item combination manners are as follows. A first item combination manner is that a first group of items is transported for the first time, the first group of items includes items A and items B, and a second group of items is transported for the second time, and the second group of items includes items C, for convenience of description, this item combination manner is abbreviated as (A+B, C). A second item combination manner is that a first group of items is transported for the first time, the first group of items includes items A and items C, and a second group of items is transported for the second time, the second group of items includes items B, for convenience of description, this item combination manner is abbreviated as (A+C, B). A third item combination manner is that a first group of items is transported for the first time, the first group of items includes items A, and a second group of items is transported for the second time, the second group of items includes items B and items C, for convenience of description, this item combination manner is abbreviated as (A, B+C). According to the volume information of the hopper 310 and the volume information of the items A, the volume information of the items B and the volume information of the items C, it is judged whether each group of items in each item combination manner can be accommodated by the hopper 310. If there is at least one item combination manner such that each group of items can be accommodated by the hopper 310, for example, it is determined that each group of items of the first item combination manner and each group of items of the second item combination manner can be accommodated by the hopper 310, and one group of items (e.g. the second group of items, i.e. items B and items C) in the third item combination manner cannot be accommodated by the hopper 310, it is determined that the lowest number of item dispensing operations is 2, and all of item combination manners in the case of two item dispensing operations are: (A+B, C) and (A+C, B).

In a second embodiment of the present application, S100 can also be implemented in the following manners: determining all of item combination manners according to the items to be purchased, and judging whether each group of items in each of the item combination manners is able to be transported by the hopper 310; and determining all of the item combination manners having the lowest number of item dispensing operations, among item combination manners in which the each group of items is able to be transported by the hopper 310 as the candidate item combination manners.

For example, in this embodiment, in a case where the control apparatus 500 receives a purchase command to purchase items A, items B and items C input by the user, it is determined that all of item combination manners include a first item combination manner, a second item combination manner, a third item combination manner, a fourth item combination manner and a fifth item combination manner. The first item combination manner is that items A, items B and items C are transported for one time, for convenience of description, this item combination manner is abbreviated as (A+B+C). The second item combination manner is that a first group of items is transported for the first time, the first group of items includes items A and B, and a second group of items is transported for the second time, the second group of items includes items C, for convenience of description, this item combination manner is abbreviated as (A+B, C). The third item combination manner is that a first group of items is transported for the first time, the first group of items includes items A and items C, and a second group of items is transported for the second time, the second group of items includes items B, for convenience of description, this item combination manner is abbreviated as (A+C, B). The fourth item combination manner is that a first group of items is transported for the first time, the first group of items includes items A, and a second group of items is transported for the second time, the second group of items includes items B and items C, for convenience of description, this item combination manner is abbreviated as (A, B+C). The fifth item combination manner is that items A is transported for the first time, items B is transported for the second time, and items C is transported for the third time, for convenience of description, this item combination manner is abbreviated as (A, B, C). According to the volume information of the hopper 310 and the volume information of the items A, the volume information of the items B and the volume information of the items C, it is judged whether each group of items in each item combination manner can be accommodated by the hopper 310, for example, it is determined that each group of items of the second item combination manner, each group of items of the third item combination manner and each group of items of the fifth item combination manner can be accommodated by the hopper 310, and good A, good B and items C of the first item combination manner cannot be accommodated by the hopper 310 at the same time, and one group of items (e.g. the second group of items, i.e. items B and items C) of the fourth item combination manner cannot be accommodated by the hopper 310. Since the number of item dispensing operations in the second item combination manner and the third item combination manner is 2, and the number of item dispensing operations in the fifth item combination manner is 3, it is determined that the lowest number of item dispensing operations is 2, and all of item combination manners in the case of two item dispensing operations are: (A+B, C) and (A+C, B).

Optionally, the control apparatus 500 judges whether the each group of items in the each of the item combination manners is able to be transported by the hopper 310 according to prestored first space geometrical information of the hopper and second space geometrical information of each type of the items to be purchased. Exemplarily, in a case where the first space geometrical information includes the volume information of the hopper 310, and the second space geometrical information includes the volume information of the items, the control apparatus 500 can judge whether each group of items in each item combination manner can be accommodated by the hopper 310 according to the volume information of the hopper 310 and the volume information of each type of items. Optionally, judging whether the each group of items in the each of the item combination manners is able to be transported by the hopper further includes judging whether the each group of items in the each of the item combination manners is able to be transported by the hopper 310 according to maximum load information of the hopper 310 and weight information of each type of the items to be purchased.

In S200, all of pickup manners for picking up items in each of the candidate item combination manners are determined.

Taking the automatic vending machine 010 provided by the present application as an example, after the lowest number of item dispensing operations and all of candidate item combination manners corresponding to the lowest number of item dispensing operations are determined, for each candidate item combination manner, the control apparatus 500 judges whether the number of one group of items to be conveyed by the hopper 310 for each item dispensing operation is greater than 1. In a case where the number of one group of items to be conveyed by the hopper 310 for one item dispensing operation is greater than 1, the control apparatus 500, according to the different order of picking up this group of items from the item column 210, determines all of possible pickup manners for picking up this group of items from the item column 210 by the hopper 310, and then the control apparatus 500 determines all possible pickup manners for picking up all items of the candidate item combination manner from the item column 210. The control apparatus 500 sequentially confirms all of possible pickup manners for picking up the items in each candidate item combination manner until all of pickup manners for picking up the items in all of candidate item combination manners are confirmed.

For example, in a case where the items to be picked up include items A, items B, items C and items D, as described above, if it is determined that all of candidate item combination manners in a case where the lowest number of item dispensing operations is 2 include (A+B+C, D) and (A+C+D, B), for this candidate combination manner of (A+B+C, D), there are six possible manners to pick up the items and transport the items to the pickup port 103 in this candidate item combination manner. A first pickup manner may be that the hopper 310 is firstly controlled to pick up items A, items B, and items C in sequence, then transports items A, items B and items C to the pickup port 103, and the hopper 310 is secondly controlled to pick up items D and transports items D to the pickup port 103. A second pickup manner may be that the hopper 310 is firstly controlled to pick up items A, items C, and items B in sequence, then transports items A, items B and items C to the pickup port 103, and the hopper 310 is secondly controlled to pick up items D and transports items D to the pickup port 103. A third pickup manner may be that the hopper 310 is firstly controlled to pick up items B, items C, and items A in sequence, then transports items A, items B and items C to the pickup port 103, and the hopper 310 is secondly controlled to pick up items D and transports items D to the pickup port 103. A fourth pickup manner may be that the hopper 310 is firstly controlled to pick up items B, items A, and items C in sequence, then transports items A, items B and items C to the pickup port 103, and the hopper 310 is secondly controlled to pick up items D and transports items D to the pickup port 103. A fifth pickup manner may be that the hopper 310 is firstly controlled to pick up items C, items A, and items B in sequence, then transports items A, items B and items C to the pickup port 103, and the hopper 310 is secondly controlled to pick up items D and transports items D to the pickup port 103. A sixth pickup manner may be that the hopper 310 is firstly controlled to pick up items C, items B, and items A in sequence, then transports items A, items B and items C to the pickup port 103, and the hopper 310 is secondly controlled to pick up items D and transports items D to the pickup port 103. Similarly, for this candidate item combination manner of (A+C+D, B), the control apparatus 500 determines all of possible pickup manners for picking up the items, and the determination manner is the same as the above manners and will not be repeated herein. Finally, the control apparatus 500 determines all twelve possible pickup manners for picking up the items in all of the candidate item combination manners.

In S300, all of item dispensing paths in one-to-one correspondence to all of the pickup manners of all of the candidate item combination manners are determined.

Taking the automatic vending machine 010 provided by the present application as an example, the control apparatus 500 takes the position of the pickup port 103 as a coordinate origin, takes the left-and-right direction (the direction shown by arrow ab in FIG. 2) as an X axis, and takes the up-and-down direction (the direction shown by arrow cd in FIG. 2) as a Y axis to establish a coordinate system. The coordinates of the items to be purchased in the above-mentioned coordinate system are determined according to the correspondence between each type of items and the item column 210 accommodating the items stored in the storage apparatus 400, and all of item dispensing paths in one-to-one correspondence to pickup manners are determined according to the coordinates of the items to be purchased and all the pickup manners for picking up the items in each candidate combination manner determined above.

Figure 6:
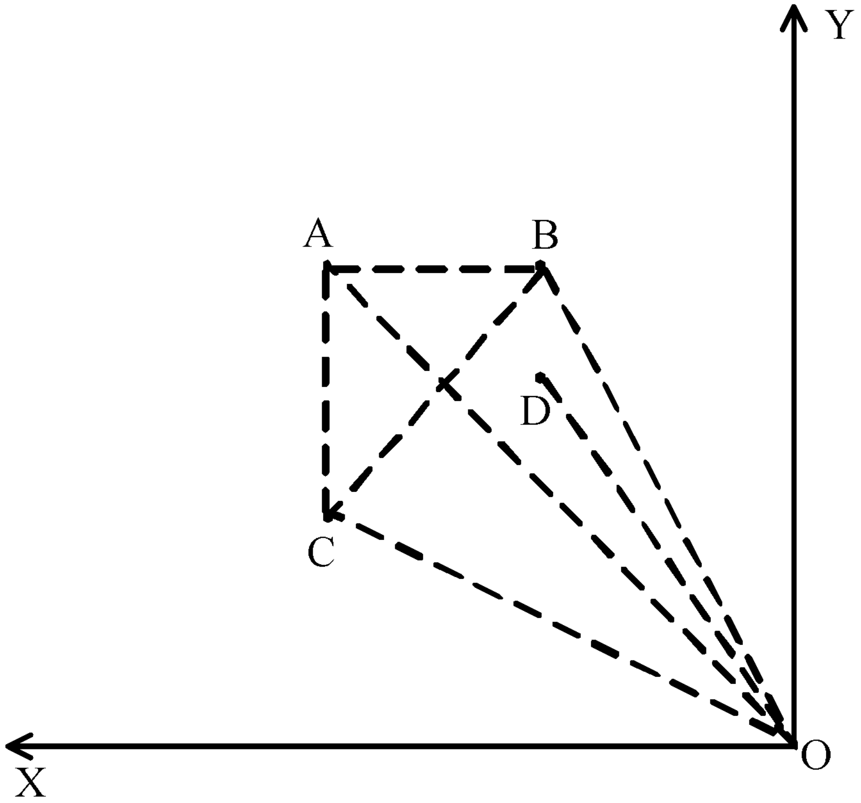
FIG. 6 is a schematic view of a coordinate system of an item dispensing path of an automatic vending machine in an item combination manner according to an embodiment of the present application.

FIG. 6 is a schematic view of a coordinate system of an item dispensing path of an automatic vending machine in an item combination manner according to an embodiment of the present application. As shown in FIG. 6, the items to be picked up include items A, items B, items C and items D, as described above, if it is confirmed that candidate item combination manners in a case where the lowest number of item dispensing operations is 2 include (A+B+C, D) and (A+C+D, B). For this candidate combination manner of (A+B+C, D), according to the coordinates of items A, items B and items C and all of possible pickup manners for picking up the items and transporting the items to pick port 103 in this candidate item combination manner, all optional item dispensing paths for this candidate item combination manner are determined to be (OA+AB+BC+CO, OD+DO), (OA+AC+CB+BO, OD+DO), (OB+BC+CA+AO, OD+DO), (OB+BA+AC+CO, OD+DO), (OC+CA+AB+BO, OD+DO), (OC+CB+BA+AO, OD+DO), (OC+CA+AB+BO, OD+DO) respectively. Similarly, all of optional pickup manners for this candidate item combination manner of (A+C+D, B) can be determined until all of optional item dispensing paths in one-to-one correspondence to all of pickup manners of all of the candidate item combination manners are determined, and the determination manner is the same as the above manners and will not be repeated herein.

In S400, an item dispensing path having a highest efficiency is selected from all of the item dispensing paths as a target item dispensing path, and based on the target item dispensing path, the hopper 310 is controlled to dispense items.

In the first embodiment of the present application, S400 may be implemented through the following manners: calculating delivery time of each of the item dispensing paths and receiving/pickup time of each of the item dispensing paths; determining item dispensing time of the each of the item dispensing paths according to the delivery time of the each of the item dispensing paths and the receiving/pickup time of the each of the item dispensing paths; and selecting an item dispensing path having a shortest item dispensing time as the target item dispensing path. In this embodiment, the delivery time of each of the item dispensing paths is time during which the hopper 310 moves in an item dispensing process, and the receiving/pickup time is total time for all items to be transported from the item column 210 to the hopper 310 in the pickup manner corresponding to the item dispensing paths.

Taking the automatic vending machine 010 provided in the present application as an example, the item dispensing time of each item dispensing path is determined according to the movement speed of the hopper 310, and the item dispensing path and the preset pickup/receiving time. In the automatic vending machine 010 provided in the present application, the hopper 310 moves to the outlet of an item column 210 and receives the items conveyed by the conveying mechanism 211 within the item column 210, therefore, the control apparatus 500 determines the item dispensing time of each item dispensing path according to the movement speed of the hopper 310, the item dispensing path and the preset receiving time. In other embodiments, the hopper 310 may be provided with a grab mechanism, and the grab mechanism can pick up the items within the item column 210, therefore, the control apparatus 500 determines the item dispensing time of each item dispensing path according to the movement speed of the hopper 310, the item dispensing path and the preset pickup time.

Optionally, the control apparatus 500 determines the item dispensing time of each item dispensing path according to the delivery time of each item dispensing path and the receiving/pickup time, where the control apparatus 500 determines the delivery time according to the movement speed and the item dispensing path, and when the minimum number of shipments is greater than one time, the control apparatus 500 respectively determines the time at which the hopper 310 transports one group of items each time, and then determines the delivery time of the hopper 310 according to the sum of the time at which the hopper 310 transports all of the groups of items. The control apparatus 500 determines the receiving/pickup time according to the preset time at which the hopper 310 receives/picks up one piece of items and the quantity of items to be purchased this time.

Referring to FIG. 6, taking the item dispensing path (OA+AB+BC+CO, OD+DO) as an example, the delivery time $T_1=S_{OA}/V_{OA}+S_{AB}/V_{AB}+S_{BC}/V_{BC}+S_{CO}/V_{CO}+S_{OD}/V_{OD}+S_{DO}/V_{DO}$, where $S_{OA}$ is the distance between O and A, $V_{OA}$ is the speed at which the hopper 310 moves between O and A, and other parameters should be understood similarly. The receiving/pickup time is $T_2=T_A+T_B+T_C+T_D$, where $T_A$ is time required for the hopper 310 to receive/pick up items A, and the other parameters $T_B$, $T_C$, $T_D$, etc. should be understood similarly. The item dispensing time of this item dispensing path is $T=T_1+T_2$.

The control apparatus 500 determines the item dispensing path having the shortest item dispensing time from all of the item dispensing paths as the target item dispensing path, and controls the hopper drive mechanism 320 to drive the hopper 310 dispense items based on the target item dispensing path.

In the second embodiment of the present application, S400 may be further implemented through the following manner: selecting the item dispensing path having the shortest length as the target item dispensing path. In a case where the movement speed of the hopper 310 is a constant value, the control apparatus 500 can also select the item dispensing path having the shortest length as the item dispensing path having the shortest item dispensing time, and control the hopper 310 to dispense items through this path. Taking the item dispensing path (OA+AB+BC+CO, OD+DO) as an example, the path length is $S=S_{OA}+S_{AB}+S_{BC}+S_{CO}+S_{OD}+S_{DO}$.

The item dispensing method of the automatic vending machine provided in this embodiment determines all of the item combination manners having the lowest number of item dispensing operations and all of pickup manners for picking up items in each item combination manner, so that all of optional item dispensing paths in a case where the number of item dispensing operations is lowest are acquired, then an item dispensing path having the highest efficiency from all of the optional item dispensing paths is determined as the target item dispensing path. Based on the target item dispensing path, the hopper 310 is controlled to dispense the items. Since in the item dispensing method of the automatic vending machine provided in the present application, the item dispensing path having the highest efficiency among all optional item dispensing paths having the lowest number of item dispensing operations is determined as the target item dispensing path, thus the target item dispensing path is an item dispensing path having the shortest item dispensing time and the highest efficiency in a case where the number of item dispensing operations is lowest. Therefore, the item dispensing method of the automatic vending machine provided in the present application shortens the item dispensing time, improves the user experience, and improves the problem of low item dispensing efficiency existing in the item dispensing method of the automatic vending machine provided in the related art.

What is claimed is:

1. An item dispensing method of an automatic vending machine, wherein the automatic vending machine comprises a cabinet, a control apparatus, a storage apparatus, a plurality of item columns disposed within the cabinet, a pickup port disposed on a surface of the cabinet and a delivery apparatus disposed between the plurality of item columns and the pickup port, and the delivery apparatus comprises a hopper and a hopper drive mechanism configured to drive the hopper to move between the plurality of item columns and the pickup port; the item dispensing method of the automatic vending machine comprises:

receiving, by the control apparatus, a purchased command, and determining, by the control apparatus, all items to be purchased by a user according to the purchase command, determining, by the control apparatus, all of item combination manners having a lowest number of item dispensing operations as candidate item combination manners according to first space geometrical information of the hopper and second space geometrical information of each type of items to be purchased which are stored in the storage apparatus;

determining, by the control apparatus, all of pickup manners for picking up items in each of the candidate item combination manners;

determining, by the control apparatus, all of item dispensing paths in one-to-one correspondence to all of the pickup manners of all of the candidate item combination manners; according to a correspondence between each type and the plurality of item columns accommodating items which is stored in the storage apparatus; and selecting, by the control apparatus, an item dispensing path having a highest efficiency from all of the item dispensing paths as a target item dispensing path, and controlling, by the control apparatus, the hopper drive mechanism to drive the hopper to dispense items based on the target item dispensing path.

2. The item dispensing method of the automatic vending machine of claim 1, wherein determining, by the control apparatus, all of the item combination manners having the lowest number of item dispensing operations as the candidate item combination manners according to the first space geometrical information of the hopper and the second space geometrical information of each type of items to be purchased which are stored in the storage apparatus comprises:

according to the items to be purchased, judging, by the control apparatus whether each group of items in each of the item combination manners is able to be transported by the hopper in a case of N item dispensing operations, sequentially as N ascends, until it is determined that each group of items in at least one item combination manner is able to be transported by the hopper; and determining, by the control apparatus, all of item combination manners in which each group of items is able to be transported by the hopper as the candidate item combination manners in a case of N item dispensing operations; wherein N is a positive integer.

3. The item dispensing method of the automatic vending machine of claim 1, wherein determining, by the control apparatus, all of the item combination manners having the lowest number of item dispensing operations as the candidate item combination manners according to the first space geometrical information of the hopper and the second space geometrical information of each type of items to be purchased which are stored in the storage apparatus comprises:

determining, by the control apparatus, all of item combination manners according to the items to be purchased, and judging whether each group of items in each of the item combination manners is able to be transported by the hopper according to the first space geometrical information of the hopper and the second space geometrical information of each type of items to be purchased which are stored in the storage apparatus; and determining, by the control apparatus, all of the item combination manners having the lowest number of item dispensing operations, among item combination manners in which the each group of items is able to be transported by the hopper as the candidate item combination manners.

4. The item dispensing method of the automatic vending machine of claim 2, wherein judging, by the control apparatus whether the each group of items in the each of the item combination manners is able to be transported by the hopper comprises:

judging, by the control apparatus, whether the each group of items in the each of the item combination manners is able to be transported by the hopper according to the first space geometrical information of the hopper and the second space geometrical information of each type of the items to be purchased;

wherein the first space geometrical information comprises capacity information of the hopper, and the second space geometrical information comprises volume information of items.

5. The item dispensing method of the automatic vending machine of claim 4, wherein judging, by the control apparatus whether the each group of items in the each of the item combination manners is able to be transported by the hopper further comprises:

judging, by the control apparatus whether the each group of items in the each of the item combination manners is able to be transported by the hopper according to maximum load information of the hopper and weight information of each type of the items to be purchased.

6. The item dispensing method of the automatic vending machine of claim 1, wherein selecting, by the control apparatus, the item dispensing path having the highest efficiency from all of the item dispensing paths as the target item dispensing path comprises:

calculating, by the control apparatus, delivery time of each of the item dispensing paths and receiving/pickup time of each of the item dispensing paths;

determining, by the control apparatus, item dispensing time of the each of the item dispensing paths according to the delivery time of the each of the item dispensing paths and the receiving/pickup time of the each of the item dispensing paths; and selecting an item dispensing path having a shortest item dispensing time as the target item dispensing path.

7. The item dispensing method of the automatic vending machine of claim 6, wherein the delivery time is calculated by the control apparatus according to a movement speed of the hopper and a length of the item dispensing path.

8. The item dispensing method of the automatic vending machine of claim 6, wherein the receiving/pickup time is calculated by the control apparatus according to preset time of receiving/picking up a piece of items by the hopper, and a quantity of items to be purchased in this time.

9. The item dispensing method of the automatic vending machine of claim 1, wherein selecting, by the control apparatus, the item dispensing path having the highest efficiency from all of item dispensing paths as the target item dispensing path comprises:

selecting, by the control apparatus an item dispensing path having a shortest length as the target item dispensing path.

10. The item dispensing method of the automatic vending machine of claim 3, wherein judging, by the control apparatus, whether the each group of items in the each of the item combination manners is able to be transported by the hopper comprises:

judging, by the control apparatus, whether the each group of items in the each of the item combination manners is able to be transported by the hopper according to the first space geometrical information of the hopper and the second space geometrical information of each type of the items to be purchased;

wherein the first space geometrical information comprises capacity information of the hopper, and the second space geometrical information comprises volume information of items.

11. The item dispensing method of the automatic vending machine of claim 10, wherein judging, by the control apparatus, whether the each group of items in the each of the item combination manners is able to be transported by the hopper further comprises:

judging, by the control apparatus whether the each group of items in the each of the item combination manners is able to be transported by the hopper according to maximum load information of the hopper and weight information of each type of the items to be purchased.

12. An automatic vending machine, comprising a control apparatus, a storage apparatus, a cabinet, a plurality of item columns disposed within the cabinet, a pickup port disposed on a surface of the cabinet, and a delivery apparatus disposed between the plurality of item columns and the pickup port, wherein the delivery apparatus comprises a hopper, and a hopper drive mechanism configured to drive the hopper to move between the plurality of item columns and the pickup port, the hopper drive mechanism and the storage apparatus are each electrically connected to the control apparatus, and the control apparatus is configured to:

receive a purchase command, and determine all items to be purchased by a user according to the purchase command;

determine, according to first space geometrical information of the hopper and second space geometrical information of each type of items to be purchased which are stored in the storage apparatus, all of item combination manners having a lowest number of item dispensing operations as candidate item combination manners;

determine all of pickup manners for picking up items in each of the candidate item combination manners;

determine, according to correspondence between each type of items and the plurality of item columns accommodating items which is stored in the storage apparatus, all of item dispensing paths in one-to-one correspondence to all of the pickup manners of all of the candidate item combination manners; and select, from all of the item dispensing paths, an item dispensing path having a highest efficiency as a target item dispensing path, and control, based on the target item dispensing path, the hopper drive mechanism to drive the hopper to dispense items.

* * * * *